(12) United States Patent
Jackson

(10) Patent No.: US 11,021,989 B2
(45) Date of Patent: Jun. 1, 2021

(54) ENVIRONMENTAL BARRIER MULTI-PHASE ABRADABLE COATING

(71) Applicant: United Technologies Corporation, Farmington, CT (US)

(72) Inventor: Richard Wesley Jackson, Groton, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 189 days.

(21) Appl. No.: 16/038,723

(22) Filed: Jul. 18, 2018

(65) Prior Publication Data

US 2020/0024974 A1 Jan. 23, 2020

(51) Int. Cl.
*F01D 11/12* (2006.01)
*C04B 41/52* (2006.01)
*C04B 41/89* (2006.01)

(52) U.S. Cl.
CPC ............ *F01D 11/122* (2013.01); *C04B 41/52* (2013.01); *C04B 41/89* (2013.01)

(58) Field of Classification Search
CPC ........ F01D 11/122; C04B 41/52; C04B 41/89
See application file for complete search history.

(56) References Cited

U.S. PATENT DOCUMENTS

| | | | |
|---|---|---|---|
| 6,355,338 B1* | 3/2002 | Hilmas | ............. C04B 35/62868 428/297.1 |
| 6,541,134 B1 | 4/2003 | Strangman et al. | |
| 8,153,204 B2* | 4/2012 | Kulkarni | ................... C23C 4/10 427/454 |
| 9,975,812 B2* | 5/2018 | Doesburg | .............. C04B 35/486 |
| 10,072,520 B2* | 9/2018 | Pisacreta | ................... F02C 7/12 |
| 2003/0044593 A1* | 3/2003 | Vaidyanathan | ....... B29C 70/382 428/297.4 |
| 2006/0100086 A1 | 5/2006 | Mechnich | |
| 2008/0124548 A1* | 5/2008 | Sporer | ................... C04B 35/48 428/402 |
| 2012/0328886 A1 | 12/2012 | Schmidt et al. | |
| 2015/0354392 A1* | 12/2015 | Lipkin | ................. F01D 11/122 415/173.4 |
| 2016/0265367 A1* | 9/2016 | Rosenzweig | ........... C04B 41/89 |
| 2016/0332922 A1 | 11/2016 | Tang et al. | |
| 2016/0333454 A1 | 11/2016 | Tang et al. | |
| 2017/0167279 A1 | 6/2017 | Kirby et al. | |

FOREIGN PATENT DOCUMENTS

| | | |
|---|---|---|
| EP | 0262844 A2 | 4/1988 |
| EP | 1734146 A1 | 12/2006 |
| EP | 1865150 A1 | 12/2007 |
| EP | 3037394 A1 | 6/2016 |

OTHER PUBLICATIONS

European Search Report for European Application No. 19183339.1, Application Filing Date Jun. 28, 2019; dated Dec. 5, 2019, 8 pages.

* cited by examiner

*Primary Examiner* — Woody A Lee, Jr.
(74) *Attorney, Agent, or Firm* — Cantor Colburn LLP

(57) ABSTRACT

Disclosed is a multi-phase abradable coating including a ceramic matrix and a dislocator phase.

11 Claims, 3 Drawing Sheets

ENVIRONMENTAL BARRIER MULTI-PHASE ABRADABLE COATING

BACKGROUND

Exemplary embodiments of the present disclosure pertain to the art of abradable coatings for ceramic matrix composites (CMC).

Within a turbine engine, a shroud is a ring of material surrounding rotating blades. Turbine performance and efficiency may be enhanced by reducing the space between the tip of the rotating blade and the stationary shroud to limit the flow of air over or around the top of the blade that would otherwise bypass the blade. For example, a blade may be configured so that its tip fits close to the shroud during engine operation. Thus, generating and maintaining an efficient tip clearance is desired for efficiency purposes.

During engine operation, the blade tips can sometimes rub against the shroud. It is desirable to have an abradable coating which can be worn away by the blade to minimize the gap between the blade and shroud without damaging the blade. Additionally, the remaining coating must remain durable and protect the underlying substrate. For CMC shrouds, an environmental barrier coating (EBC) is required for successful performance/survival of the part.

In order to reduce the risk of coating loss, an abradable layer, is deposited on top of the EBC to protect it from blade rub. In some cases the abradable coating is depleted by the initial engine burn in. Thus, an improved abradable coating for a CMC component such as a shroud is desired.

BRIEF DESCRIPTION

Disclosed is a multi-phase abradable coating including a ceramic matrix and a dislocator phase.

In addition to one or more of the features described above, or as an alternative to any of the foregoing embodiments, the dislocator phase may include zircon, $ZrO_2$ or a combination thereof.

In addition to one or more of the features described above, or as an alternative to any of the foregoing embodiments, the multi-phase abradable coating includes $ZrO_2$. At least a portion of the $ZrO_2$ may be micro-cracked.

In addition to one or more of the features described above, or as an alternative to any of the foregoing embodiments, the ceramic matrix includes hafnium dioxide, a rare earth disilicate, a rare earth monosilicate, hafnium silicate, BSAS, or a combination thereof.

Also disclosed is a coating system on a ceramic matrix composite component including a multi-phase abradable coating in combination with a top coat, a bond coat or a combination thereof. The multi-phase abradable coating includes a ceramic matrix and a dislocator phase.

In addition to one or more of the features described above, or as an alternative to any of the foregoing embodiments, the dislocator phase includes zircon, $ZrO_2$ or a combination thereof.

In addition to one or more of the features described above, or as an alternative to any of the foregoing embodiments, the multi-phase abradable coating includes $ZrO_2$. At least a portion of the $ZrO_2$ may be micro-cracked.

In addition to one or more of the features described above, or as an alternative to any of the foregoing embodiments, the ceramic matrix includes hafnium dioxide, a rare earth disilicate, a rare earth monosilicate, hafnium silicate, BSAS, or a combination thereof.

In addition to one or more of the features described above, or as an alternative to any of the foregoing embodiments, the coating system includes a top coat and a bond coat and further wherein the bond coat is disposed on the ceramic matrix component and the top coat is disposed between the bond coat and the multi-phase abradable coating.

In addition to one or more of the features described above, or as an alternative to any of the foregoing embodiments, the coating system includes a top coat disposed between the ceramic matrix component and the multi-phase abradable coating.

In addition to one or more of the features described above, or as an alternative to any of the foregoing embodiments, the coating system includes a bond coat disposed between the ceramic matrix component and the multi-phase abradable coating.

In addition to one or more of the features described above, or as an alternative to any of the foregoing embodiments, the bond coat includes silicon.

In addition to one or more of the features described above, or as an alternative to any of the foregoing embodiments, the top coat includes hafnium dioxide, a rare earth disilicate, or a combination thereof.

In addition to one or more of the features described above, or as an alternative to any of the foregoing embodiments, the top coat and the ceramic matrix include the same material.

In addition to one or more of the features described above, or as an alternative to any of the foregoing embodiments, the ceramic matrix composite component is a shroud for the turbine section of a gas turbine engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed coating and coating system are presented herein by way of exemplification and not limitation with reference to the Figures.

Figure 1:
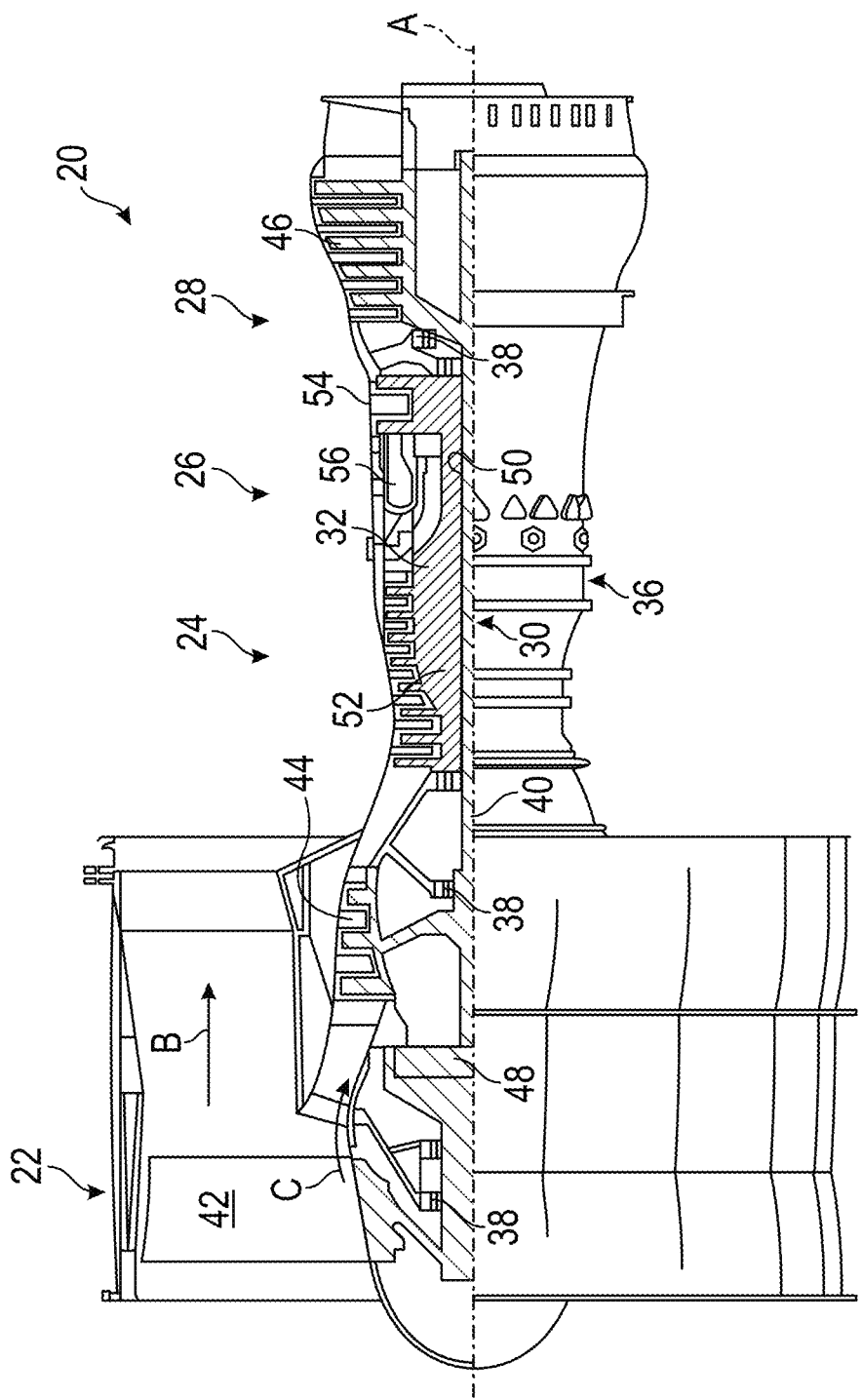
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Figure 2:
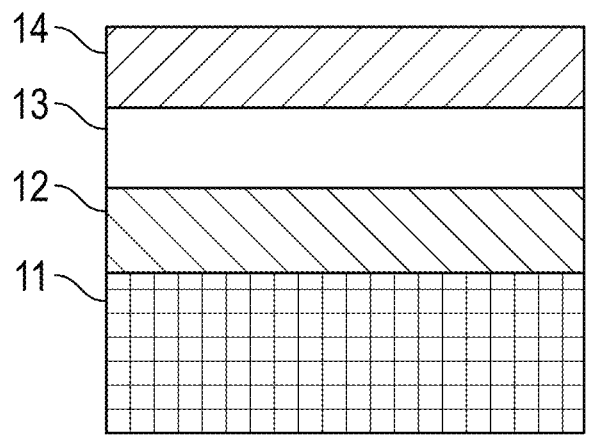
FIGS. 2-4 are representations of embodiments of abradable coating systems.
Figure 3:
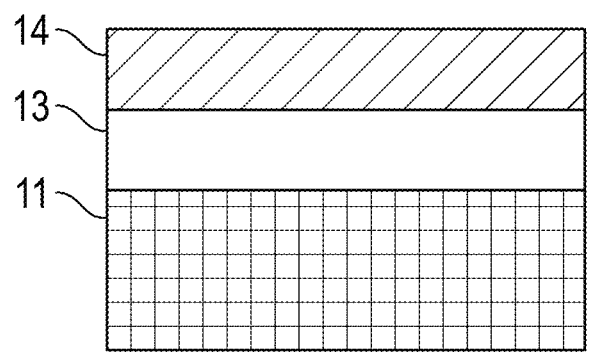
Figure 4:
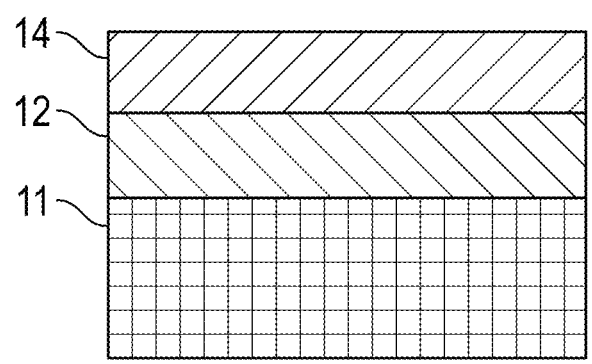

As discussed above the turbine section 28 includes a shroud having an abradable coating system disposed on a ceramic matrix composite substrate. The abradable coating system includes a multi-phase abradable coating with a top coat, a bond coat or both a top coat and a bond coat. FIG. 2 shows a coating system having a multi-phase abradable coating 14 disposed on a top coat 13. Top coat 13 is disposed on a bond coat 12. Bond coat 12 is disposed on CMC substrate 11. Alternatively, the coating system, as shown in FIG. 3, may have a multi-phase abradable coating 14 disposed on top coat 13, which is, in turn, disposed on CMC substrate 11. In another embodiment the coating system, as shown in FIG. 4, includes a multi-phase abradable coating 14 disposed on bond coat 12, which is, in turn, disposed on CMC substrate 11.

The multi-phase abradable coating includes a dislocator phase dispersed in a ceramic matrix. The dislocator phase transforms to a micro-cracked phase through exposure to a combustion gas atmosphere. This allows the uppermost portion of the multi-phase abradable coating to be abradable while the lower portion of the multi-phase abradable coating (the portion closest to the CMC) remains in its as deposited form. For example, when the dislocator phase includes zircon ($ZrSiO_4$), exposure to a post combustion atmosphere converts the zircon closest to the exposed surface of the multi-phase abradable coating to $ZrO_2$ because $Si(OH)_4$ vaporizes from the exposed surface. Without being bound by theory, it is thought that at least a portion of the $ZrO_2$ undergoes a phase change between tetragonal and monoclinic during normal thermal cycling of the turbine engine and the volume change associated with the phase change results in at least a portion of the $ZrO_2$ becoming micro-cracked $ZrO_2$. The presence of micro-cracked $ZrO_2$ results in an abradable material. It is also contemplated that the $ZrO_2$ can be deposited as part of the coating.

Figure 5:
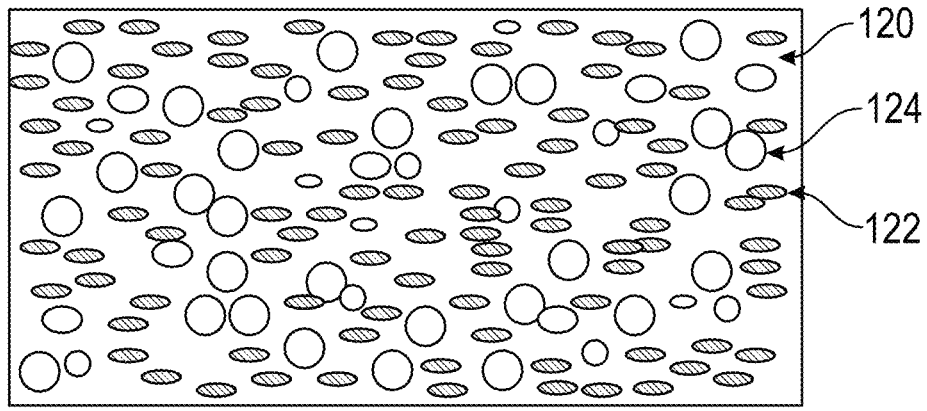
FIG. 5 is a representation of an as-deposited multi-phase abradable coating.
Figure 6:
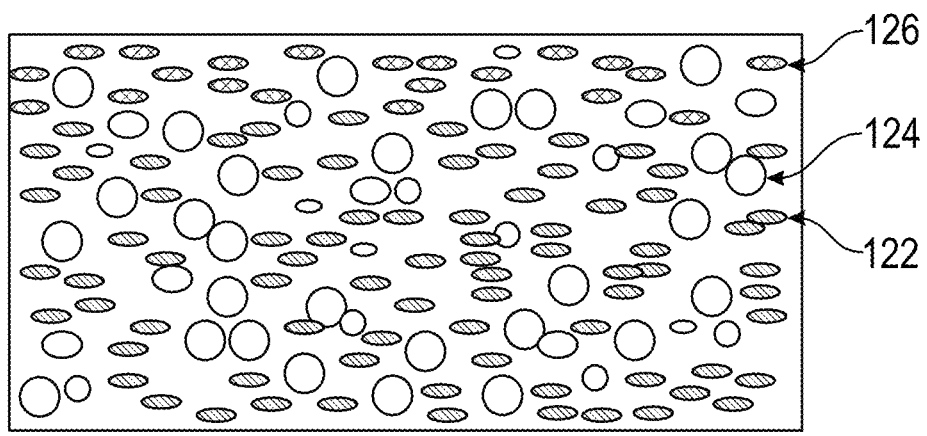
FIG. 6 is a representation of a multi-deposited multi-phase abradable coating after exposure to a post combustion atmosphere.

An embodiment of the as-deposited multi-phase abradable coating is shown in FIG. 5. FIG. 5 shows the ceramic matrix 120, the $ZrSiO_4$ dislocator phase 122 and pores 124. The multi-phase abradable coating after exposure to a post combustion atmosphere is shown in FIG. 6. FIG. 6 shows micro-cracked $ZrO_2$ 126 near the surface where previously $ZrSiO_4$ was located. FIG. 6 shows that the multi-phase abradable coating retains $ZrSiO_4$ 122 in the interior of the coating.

As mentioned above, the multi-phase abradable coating includes a ceramic matrix. Exemplary ceramic matrices include hafnium dioxide, rare earth disilicates, rare earth monosilicates, hafnium silicate, BSAS ($BaO_{1-x}$—$SrO_x$—$Al_2O_3$-$2SiO_2$), and combinations thereof. Rare earth metals include cerium, dysprosium, erbium, europium, gadolinium, holmium, lanthanum, lutetium, neodymium, praseodymium, promethium, samarium, terbium, thulium, ytterbium, and yttrium. Exemplary rare earth disilicates include yttrium-ytterbium disilicate (YbYDS), ytterbium disilicate (YbDS), lutetium disilicate (LuDS), thulium disilicate (TmDS), lutetium yttrium disilicate (LuYDS), thulium yttrium disilicate (TmYDS) and combinations thereof. In general, the ceramic matrix is chosen to have a coefficient of thermal expansion similar to that of the CMC.

The multi-phase abradable coating may have a thickness of 2 to 50 mils, or, more specifically, 5 to 20 mils. The multi-phase abradable coating may have a porosity of 1 to 20%, or, more specifically, 5 to 10%. The as-deposited multi-phase abradable coating may have a dislocator phase content of 5 to 25 vol %, or, more specifically, 1 to 20 vol %. The multi-phase abradable coating may be deposited by a thermal spray method such as plasma spray. It is contemplated that plasma spray conditions may convert some or all of the dislocator phase (such as zircon) to the precursor to the micro-cracked phase (such as $ZrO_2$) and a heat treatment would be required to reform the dislocator phase prior to exposure to a post combustion atmosphere.

The top coat, when present, includes hafnium dioxide, a rare earth disilicate (as described above) or a combination thereof. The top coat may have a thickness of 2 to 12 mils, or, more specifically, 4 to 8 mils. The top coat may have a porosity which is less than that of the multi-phase abradable coating. The top coat is free of the dislocator phase. The top coat may be deposited by slurry deposition or air plasma spray.

The bond coat, when present, may include silicon. Exemplary bond coats include those having a barium-magnesium alumino silicate matrix and dispersed particles as described in US Patent Publication No. 2016/0332922, silicon oxycarbide as described in U.S. Patent Publication No. 2012/0328886, and a combination of silicon oxycarbide and calcium magnesium alumino silicate as described in 2016/0333454, all of which are incorporated by reference herein The bond coat may oxidize in service to form a silicon oxide layer positioned between the bond coat and the layer above it (either the top coat or the multi-phase abradable coating). The bond coat may have a thickness of 2 to 15 mils, or, more specifically, 5 to 10 mils. The bond coat may have a porosity of 0 to 20%, or, more specifically, 1 to 5%.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A multi-phase abradable coating comprising:
   a ceramic matrix and a dislocator phase dispersed in the ceramic matrix,
   wherein the dispersed dislocator phase comprises zircon and ZrO2,
   wherein a portion of the ZrO2 is microcracked,
   wherein the ZrO2 is configured such that it is formed near a surface by exposure to post combustion gases.

2. The multi-phase abradable coating of claim 1, wherein the ceramic matrix comprises hafnium dioxide, a rare earth disilicate, a rare earth monosilicate, BSAS, hafnium silicate, or a combination thereof.

3. A coating system on a ceramic matrix composite component comprising:
   a multi-phase abradable coating in combination with a top coat, a bond coat or a combination thereof,
   wherein the multi-phase abradable coating comprises a ceramic matrix and a dislocator phase dispersed in the ceramic matrix,
   wherein the dispersed dislocator phase comprises zircon and ZrO2,
   wherein a portion of the ZrO2 is microcracked,
   wherein the ZrO2 is configured such that it is formed near a surface by exposure to post combustion gases.

4. The coating system of claim 3, wherein the ceramic matrix comprises hafnium dioxide, a rare earth disilicate or a combination thereof.

5. The coating system of claim 3, wherein the coating system comprises the top coat and the bond coat and further wherein the bond coat is disposed on the ceramic matrix component and the top coat is disposed between the bond coat and the multi-phase abradable coating.

6. The coating system of claim 3, wherein the coating system comprises the top coat disposed between the ceramic matrix component and the multi-phase abradable coating.

7. The coating system of claim 3, wherein the coating system comprises the bond coat disposed between the ceramic matrix component and the multi-phase abradable coating.

8. The coating system of claim 3, wherein the bond coat comprises silicon.

9. The coating system of claim 3, wherein the top coat comprises hafnium dioxide, a rare earth disilicate, or a combination thereof.

10. The coating system of claim 3, wherein the top coat and the ceramic matrix comprise the same material.

11. The coating system of claim 3, wherein the ceramic matrix composite component is a shroud for the turbine section of a gas turbine engine.

* * * * *